July 18, 1950
R. H. GODDARD
2,515,644
ROTATING VALVE FOR MULTIPLE RESONANCE
COMBUSTION CHAMBERS
Filed March 11, 1947
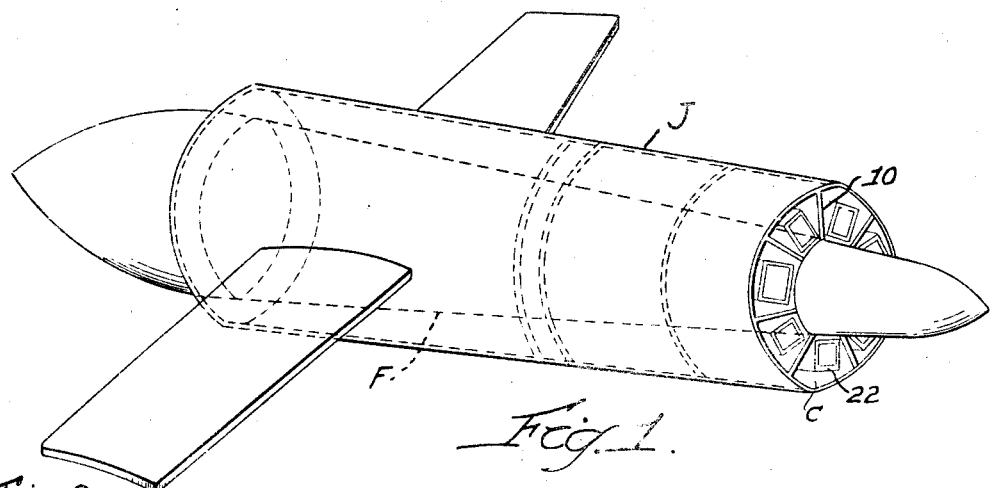
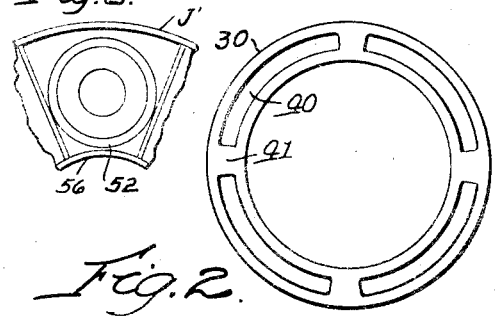
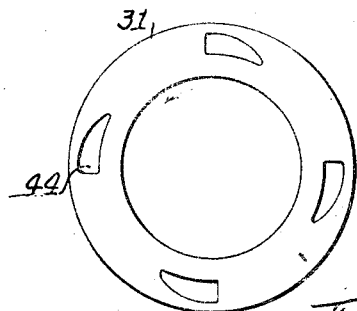
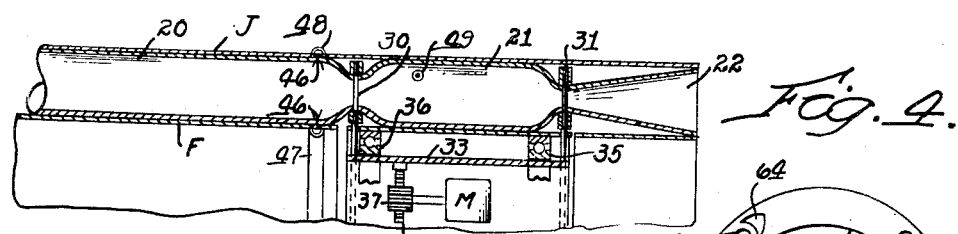
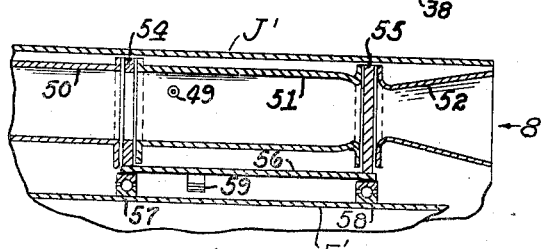
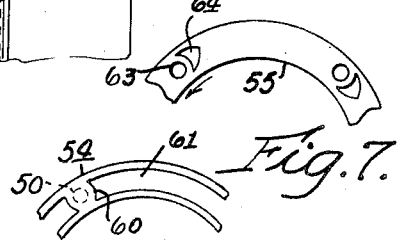
Inventor.
Robert H. Goddard, Dec'd.
Esther C. Goddard, Executrix
By Chas. T. Hawley
ATTORNEY.

Patented July 18, 1950

2,515,644

UNITED STATES PATENT OFFICE 2,515,644

ROTATING VALVE FOR MULTIPLE RESONANCE COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application March 11, 1947, Serial No. 733,829

1 Claim. (Cl. 60—35.6)

This invention relates to multiple resonance combustion chambers as used in propulsion apparatus for rockets and rocket craft.

It is the general object of the present invention to provide an improved and simplified rotating valve structure for such multiple resonance chambers, by the use of which admission and compression of the combustion elements may be conveniently controlled and accurately timed.

The invention further relates to arrangements and combinations of parts which will be hereinafter described and more particularly pointed out in the appended claim.

Preferred forms of the invention are shown in the drawing, in which

Fig. 1 is a perspective view of an aircraft embodying the invention;

Fig. 2 is a plan view of an annular disc admission valve;

Fig. 3 is a plan view of an annular disc discharge valve;

Fig. 4 is a partial sectional elevation of one of the combustion chambers and associated parts;

Fig. 5 is a similar view of a slightly modified construction;

Figs. 6 and 7 are partial plan views of the admission and discharge valves shown in section in Fig. 5; and Fig. 8 is a partial end view, looking in the direction of the arrow 8 in Fig. 5.

In the embodiment of the invention shown in the drawing, the aircraft comprises a fuselage F surrounded by a casing or jacket J which is subdivided by longitudinally extending partitions 10 into a plurality of segmental compartments C of approximately trapezoidal cross section.

Each compartment houses a resonance combustion unit which comprises an air-collecting tube 20 (Fig. 4), a combustion chamber 21 and a discharge nozzle 22. This combustion unit may be of any convenient cross section, the unit shown in Fig. 4 being of approximately square cross section as shown in Fig. 1 and the unit shown in (Figs. 5 and 8) being of circular cross section. The separate parts 20, 21 and 22 of each unit are secured in a compartment C in spaced relation so as to leave a narrow but clear space between the ends of each two adjacent parts.

An annular disc admission valve 30 (Figs. 2 and 4) is positioned between the adjacent ends of all of the parts 20 and 21, and an annular disc discharge valve 31 is mounted between the adjacent ends of all of the parts 21 and 22.

The annular disc valves 30 and 31 are preferably fixed on a sleeve 33 (Fig. 4) which is rotatably supported on bearings 35 and 36 within the fuselage F. The entire valve assembly may be rotated by a motor M having a pinion 37 engaging an internal ring gear 38 mounted within the sleeve 33. The annular disc admission valve 30 is provided with elongated slots or port openings 40 (Fig. 2) and with intervening closed portions 41, and the annular disc discharge valve 31 is similarly provided with more or less triangular port openings 44.

If the combustion unit is of square cross section, as assumed in Figs. 1 and 4, the slots or ports 40 in the annular disc valve 30 preferably have square ends. The ports 44 in the associated disc valve 31 are square at their leading or opening ends but are desirably tapered rearward to gradually close the discharge opening to each associated nozzle 22.

Fuel is preferably supplied to the admission tubes 20 adjacent the valve 30 through spray openings 46 (Fig. 4) which receive liquid fuel from inner and outer annular channel members 47 and 48, which channel members are supplied with liquid fuel under pressure from any suitable storage. Spark-plugs 49 may be provided for each resonance combustion chamber.

As thus constructed, it will be evident that the combustion chambers will be periodically closed to the admission tubes in opposite pairs by the shut-off portions 41 of the annular disc valve 30, and that the discharge passages to the associated nozzles 22 will be simultaneously opened by the annular disc valve 31, at which time also the sparkplugs 49 will be energized to explode or detonate the charges.

The construction and operation is thus very much more simple than has been proposed in the prior art, as shown for instance in the prior patent to Robert H. Goddard No. 2,395,404, issued February 26, 1946.

In the construction shown in Fig. 5, a plurality of resonance units of circular cross section are mounted between a fuselage F' and a jacket J'. Each unit comprises an admission tube 50, a combustion chamber 51, and a nozzle 52, all fixed to the fuselage F' or to the jacket J'. Annular disc valves 54 and 55 are mounted on a sleeve 56 rotatably supported on bearings 57 and 58, and the sleeve is provided with a circular internal rack 59 by which the disc valves may be rotated as previously shown and described.

When the resonance units are of circular cross section, it is found desirable that the shut-off portions 60 (Fig. 6) between the slots 61 in the admission disc valve 54 should have the outline shown, so that the opening of the admission tubes 50 may be more quickly accomplished, the tubes being opened simultaneously along large portions of their peripheries. Similarly, the discharge disc valve 55 (Fig. 7) is provided with circular openings 63, by reason of which the connections to the nozzles 52 present continuous and relatively smooth circular surfaces at the moment when combustion takes place. Gradual closing off of the nozzles is then effected by wedge-shaped openings 64, which may be slightly spaced from the openings 63, so that the smooth peripheral surfaces of the discharge passages may be continuous during initial combustion and gas discharge.

Having thus described the invention and the advantages thereof, it will be understood that the invention is not to be limited to the details herein disclosed, otherwise than as set forth in the claim, but what is claimed is:

In a resonance combustion apparatus, an annular series of resonance combustion units each comprising an admission tube, a combustion chamber and a discharge nozzle, said parts being mounted in said apparatus with slight longitudinal spacing between adjacent parts, an annular disc admission valve having port openings and positioned between the admission tube and the combustion chamber, an annular disc discharge valve having port openings and positioned between said combustion chamber and the discharge nozzle, and means to rotate said disc valves simultaneously and in predetermined fixed angular relation to each other, each resonance combustion unit being of circular cross section, the ports in the disc admission valve having the leading edge of each port convex rearward, the leading ports in the disc discharge valve being circular, and each circular port having a rearwardly wedge-shaped port associated therewith and positioned closely rearward thereof, and said associated ports effecting gradual closure of the passages to the discharge nozzles.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 674,676 | Fievet | May 21, 1901 |
| 2,395,404 | Goddard | Feb. 26, 1946 |

FOREIGN PATENTS

| Number | Country | Date |
|---|---|---|
| 409,068 | France | Feb. 9, 1910 |
| 844,442 | France | Apr. 24, 1939 |
| 387,166 | Germany | Dec. 21, 1923 |
| 666,875 | Germany | Oct. 29, 1938 |